(12) United States Patent
Takimoto et al.

(10) Patent No.: US 6,197,841 B1
(45) Date of Patent: Mar. 6, 2001

(54) CROSSLINKED ETHYLENE-OLEFIN COPOLYMER FOAMS

(75) Inventors: Isamu Takimoto, Kyotanabe; Masaaki Sahara, Himeji, both of (JP)

(73) Assignee: Sanwa Kako Company Limited, Kyoto-Fu (JP)

( * ) Notice: Subject to any disclaimer, the term of this patent is extended or adjusted under 35 U.S.C. 154(b) by 0 days.

(21) Appl. No.: 09/368,344

(22) Filed: Aug. 5, 1999

Related U.S. Application Data

(63) Continuation-in-part of application No. 09/030,507, filed on Feb. 25, 1998, now abandoned.

(30) Foreign Application Priority Data

Mar. 18, 1997 (JP) .................................................. 9-106575

(51) Int. Cl.[7] ....................................................... C08J 9/00
(52) U.S. Cl. ........................ 521/144; 521/142; 521/143; 521/134
(58) Field of Search ................... 521/142, 143, 521/144, 134

(56) References Cited

U.S. PATENT DOCUMENTS

| | | | |
|---|---|---|---|
| 5,288,762 | * 2/1994 | Park et al. | 521/143 |
| 5,340,840 | * 8/1994 | Park et al. | 521/143 |
| 5,346,925 | * 9/1994 | Sugano et al. | 521/143 |
| 5,387,620 | * 2/1995 | Park et al. | 521/143 |
| 5,468,781 | * 11/1995 | Sugano et al. | 521/60 |
| 5,763,501 | * 6/1998 | Bickhardt et al. | 521/142 |

\* cited by examiner

*Primary Examiner*—Morton Foelak
(74) *Attorney, Agent, or Firm*—Ronald P. Kananen; Rader, Fishman & Grauer

(57) ABSTRACT

A crosslinked ethylene-olefin copolymer foam and a method for the production thereof are disclosed. The foam having a gel content of 70 to 99%, an apparent density of 0.2 to 0.02 g/cm$^3$, 25% compression set at 40° C. of 0.1 to 20.0%, 25% compression hardness of 0.1 to 1.0 kgf/cm$^2$, and Asker C type surface hardness of 3 to 40 is foamed from a copolymer of ethylene and $\alpha$-olefin having 3 to 18 carbon atoms, the copolymer having a melt flow rate (MFR) of 0.1 to 100 g/10 minutes, a critical shear rate (CSR) satisfying the equation: $\log[CSR] \leqq 2.48 + 0.500 \times \log[MFR]$, a density of 0.860 to 0.935 g/cm$^3$, a Q value determined by the size exclusion chromatography (SEC) of 1.5 to 4, and an extrapolated end temperature of melting (Tem) of 65° C. to 130° C.

8 Claims, 1 Drawing Sheet

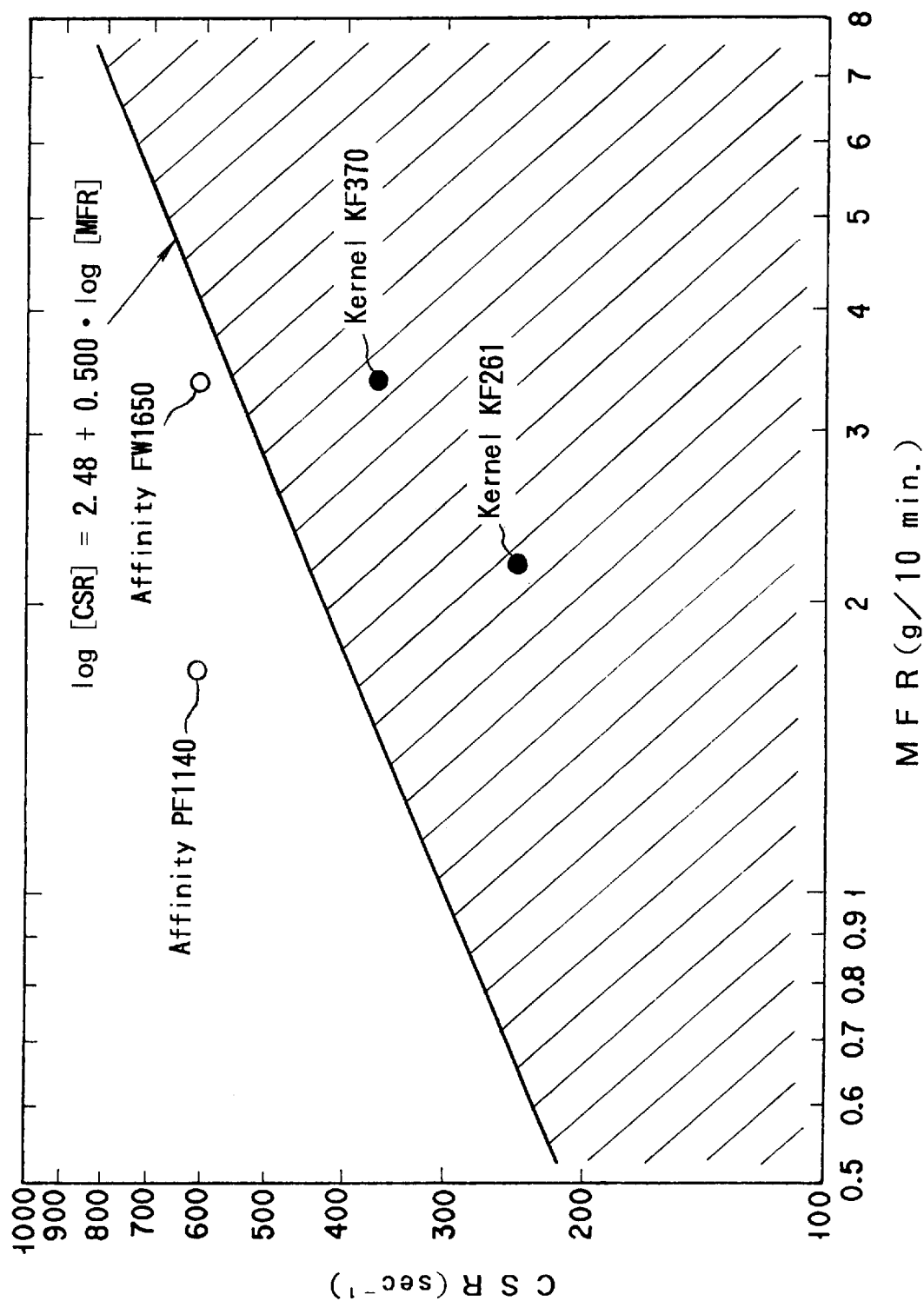

CROSSLINKED ETHYLENE-OLEFIN COPOLYMER FOAMS

CROSS-REFERENCE TO RELATED APPLICATION

This application is a continuation-in-part of U.S. Ser. No. 09/030,507, filed Feb. 25, 1998 now abandoned.

BACKGROUND OF THE INVENTION

1. Field of the Invention

This invention relates to crosslinked ethylene-olefin copolymer foams foamed from polyethylene-based resins polymerized by using a metallocene catalyst and a method for the production thereof.

2. Description of the Prior Art

Heretofore, crosslinked polyethylene foams have been produced by using low-density polyethylene or ethylene-vinyl acetate copolymer as a raw material and adopting the following process:

(a) one step foaming process in which a foamabale and crosslinkable composition charged into a mold in a press is heated therein under increased pressure and thereafter the pressure applied to the composition in the mold is released to give rise to a foam, or (b) two step foaming process, as disclosed in Japanese Patent Publication No. 45-29381 and No. 2-42649, comprising the first step in which a foamable and crosslinkable composition is heated in a closed mold under increased pressure to partially decompose a blowing agent and a crosslinking agent and the pressure is released to form an intermediate foam, and the second step in which the resultant intermediate foam is heated under atmospheric pressure to decompose the remaining blowing agent and crosslinking agent.

The foamed product obtained by the aforementioned one step foaming process is liable to deform during the course of expansion because the used polymer expands in a moment upon releasing the pressure. By the one step foaming process, therefore, there is barely obtained a foamed product of an expansion ratio up to about 15 times the original volume. On the other hand, a highly expanded foam is obtained by the two step foaming process. This process, however, has a disadvantage that the production cycle is longer than that of the one step foaming, which results in the higher manufacturing costs.

Although a low-density polyethylene foam obtained by any process exhibits excellent resistance to heat, it is lacking in flexibility and extensibility. An ethylene-vinyl acetate copolymer foam is excellent in flexibility and extensibility, but poor in heat resistance. So it can only be used at a temperature of 80° C. at the most. Besides, since the conventional resins have a wide molecular-weight distribution, it is not easy to manufacture a crosslinked foam with uniform quality.

Recently there has been proposed a foam molding technique which uses a polyethylene-based resin polymerized by using a metallocene catalyst. For example, published Japanese Patent Application, KOKAI (Early Publication) No. (hereinafter referred to briefly as "JP-A-") 7-188442 proposes a method for producing a crosslinked, foamed sheet, which method comprises irradiating a sheet of such a polyethylene-based resin 1 mm in thickness with electron rays to effect crosslinking of the resin and then heating the sheet in an oven to effect expansion thereof, as disclosed in examples. JP-A-7-207054 proposes a method of foaming a thin sheet of a mixture of polypropylene and a polyethylene-based resin polymerized by using a metallocene compound in the same manner as the above method. A foaming method disclosed in JP-A-7-179640 comprises blending a polyethylene-based resin polymerized by means of a metallocene compound with (a) a halogen-containing flame-retardant and antimony trioxide or (b) red phosphorus and a nitrogen compound, forming a sheet of the resultant blend, irradiating the sheet with electron rays to effect crosslinking of the resin, and heating the sheet to produce a thin crosslinked, foamed sheet.

As mentioned above, various methods for producing foamed thin sheets by the electron radiation crosslinking have been proposed, but those for producing chemically crosslinked block foams have not been proposed yet.

SUMMARY OF THE INVENTION

An object of the present invention, therefore, is to provide a chemically crosslinked block foam with a great thickness which is formed of a polyethylene-based resin polymerized by using a metallocene catalyst and exhibits excellent flexibility, extensibility, mechanical strength, and heat resistance.

Another object of the present invention is to provide a method of producing such a thick crosslinked foam of the polyethylene-based resin with high productivity.

To accomplish the aforementioned objects, one aspect of the present invention provides a thick crosslinked ethylene-olefin copolymer foam which has a gel content of 70 to 99%, an apparent density of 0.2 to 0.02 g/cm$^3$, 25% compression set at 40° C. of 0.1 to 20.0%, 25% compression hardness of 0.1 to 1.0 kgf/cm$^2$ and Asker C type surface hardness of 3 to 40, wherein the foam is foamed from a copolymer of ethylene and α-olefin having 3 to 18 carbon atoms, the copolymer having a melt flow rate (MFR) of 0.1 to 100 g/10 minutes, a critical shear rate (CSR) satisfying the equation: $\log[CSR] \leq 2.48 + 0.500 \times \log[MFR]$, a density of 0.860 to 0.935 g/cm$^3$, a Q value determined by the size exclusion chromatography (SEC) of 1.5 to 4, and an extrapolated end temperature of melting (Tem) of 65° to 130° C.

Since the crosslinked ethylene-olefin copolymer foam according to the present invention is excellent in flexibility, softness, and compression set, it can be advantageously used for cushioning materials, packing materials, padding materials for bedding, sealing materials, nursing media, etc.

In accordance with another aspect of the present invention, there is provided a method of producing a crosslinked ethylene-olefin copolymer foam, which method comprises kneading the aforementioned copolymer of ethylene and α-olefin having 3 to 18 carbon atoms with a blowing agent and a crosslinking agent to obtain a crosslinkable and foamable composition, heating the resultant crosslinkable and foamable composition under pressure for a prescribed period to decompose the blowing agent and the crosslinking agent, and releasing the pressure applied to the composition to obtain a crosslinked, foamed product which has an expansion ratio of 10 to 30 times the original volume of the composition.

BRIEF DESCRIPTION OF THE DRAWING

The single FIGURE attached hereto is a graph showing the relation between a critical shear rate (CSR) and a melt flow rate (MFR).

DETAILED DESCRIPTION OF THE INVENTION

A crosslinked polyethylene-based resin foam according to the present invention is foamed from a copolymer of ethylene and α-olefin having 3 to 18 carbon atoms, the copolymer having a melt flow rate (MFR) of 0.1 to 100 g/10 minutes, a critical shear rate (CSR) satisfying the equation: log[CSR] ≦2.48+0.500×log[MFR], a density of 0.860 to 0.935 g/cm$^3$, a Q value determined by the size exclusion chromatography (SEC) of 1.5 to 4, and an extrapolated end temperature of melting (Tem) of 65° to 130° C. The copolymer used in the present invention also satisfies the relation between the Tem and the density (D) represented by the formula: 833D−674≦Tem≦286D−137.

The MFR used herein means a melt flow rate (g/10 minutes) measured in accordance with the method described in JIS (Japanese Industrial Standard) K 7210. If the MFR of the ethylene-olefin copolymer exceeds 100 g/10 minutes, heat resistance thereof will be deteriorated and a foamed product with good quality will be produced only with difficulty because the melt viscosity of a starting resin compound is low. Conversely, if the MFR is less than 0.1 g/10 minutes, it will be difficult to achieve uniform dispersion of a crosslinking agent and other additives in the kneaded and molten compound because the melt viscosity thereof is high. In case the kneading of the compound is effected in an extruder, pressure of the resin compound becomes high, which results in the poor extrusion characteristics.

The ethylene-olefin copolymer used in the present invention has a critical shear rate (CSR) satisfying the equation: log[CSR]≦2.48+0.500×log[MFR]. The critical shear rate satisfying this equation is represented by the hatched area in the attached FIGURE. When the copolymer exhibiting such a critical shear rate is blended with a crosslinking agent and a blowing agent and subjected to a heat treatment under pressure, the crosslinking of the copolymer proceeds highly effectively. Since the copolymer having the critical shear rate falling in the hatched area exhibits more excellent crosslinking efficiency than the copolymer having the critical shear rate falling in the unhatched area above the straight line shown in the diagram, when crosslinked with the same amount of crosslinking agent, the foam obtained by using the former copolymer will have a higher gel content and acquire a higher tensile strength than that obtained by using the latter copolymer.

The density (g/cm$^3$) of resin used herein means that measured in accordance with the method described in JIS K 7112. If the density of resin exceeds 0.935 g/cm$^3$, the obtained foam will be unduly hard and fail to acquire high extensibility. Conversely, if the density of resin is less than 0.860 g/cm$^3$, heat resistance of the foamed product will be deteriorated.

The copolymer of ethylene and α-olefin having 3 to 18 carbon atoms used in the present invention has the "Q value" (weight-average molecular weight/number-average molecular weight) determined by means of the size exclusion chromatography (SEC) in the range of 1.5 to 4. If the Q value exceeds 4, the extensibility of foam will be deteriorated. If the Q value is less than 1.5, the kneaded and molten resin compound will acquire unduly high viscosity, poor dispersion of a crosslinking agent and the other additives therein, and undue exotherm.

The "Q value" used in this specification is obtained by calculating the ratio of weight-average molecular weight/number-average molecular weight measured by means of the size exclusion chromatography (SEC) under the conditions shown below. In this measurement, the universal calibration curve is obtained by using monodisperse polystyrene and the above molecular weights are calculated by assuming the measured values as those of straight-chain polyethylene.

Apparatus type: Waters Model ISOC GPC
Solvent: o-dichlorobenzene
Flow rate: 1 ml/min.
Temperature: 140° C.
Measurement concentration: 2 mg/l
Charged amount: 200 μl
Columns: three columns
(product of Showa Denko K. K. marketed under product code of "AD80M S")

The copolymer of ethylene and α-olefin of $C_3$ to $C_{18}$ used in the present invention has the extrapolated end temperature of melting (Tem) determined by the differential scanning calorimetry (DSC) falling in the range of 65° to 130° C. and the relation between such temperature, Tem and the density (D) represented by the following formula:

833D−674≦Tem≦286D−137 preferably, 833D−663≦Tem≦429D−271.

If the Tem of the copolymer is less than 65° C., the foamed product will exhibit lower heat resistance. If the Tem exceeds 130° C., the resin compound will be molten only with difficulty and suffer from poor dispersion of the crosslinking agent and other additives therein. If the Tem exceeds the upper limit of the range represented by the above formula, the obtained foamed product will be unduly hard and exhibit lower extensibility. If the Tem is less than the lower limit of the range represented by the above formula, the foamed product will suffer from inferior heat resistance.

The extrapolated end temperature of melting (Tem) used in this specification is determined in accordance with the following method:

First, about 5 mg of a sample is weighed out from a film 100 μm in thickness shaped by hot pressing a given copolymer and set in DSC equipment (product of SEIKO ELECTRONIC INDUSTRY CO., LTD. marketed under product code of "RDC 220"). The sample is heated to 170° C., kept at this temperature for 5 minutes, and then cooled to −10° C. at a cooling rate of 10° C./minute. The sample is then kept at −10° C. for one minute and heated to 170° C. at a heating rate of 10° C./minute to obtain the DSC curve in the range of from −10° C. to 170° C. In accordance with JIS K 7121, the temperature at the intersection of a straight line formed by extending the base line on the higher temperature side to the lower temperature side and a tangent line which touches the curve of the melting peak on the higher temperature side at the point of exhibiting maximum gradient is assumed as the Tem.

The typical examples of α-olefins include, but are not limited to: propylene, 1-butene, 1-pentene, 1-hexene, 4-methylpentene-1, and 1-octene.

The typical example of a metallocene catalyst is a mixture of metallocene complex and alumioxane.

The crosslinked ethylene-olefin copolymer foam of the present invention is obtained by mixing the aforementioned polyethylene-based resin polymerized by using a metallocene catalyst with a blowing agent, a crosslinking agent and, if required, a foaming aid, a filler, and a pigment, kneading the resultant mixture with a heated mixing roll, a kneader, an extruder or the like, then charging the resultant composition into a mold, heating the composition therein at a temperature in the range of 140° to 170° C. under pressure for a prescribed period to decompose the blowing agent and the crosslinking agent perfectly, and releasing the pressure in the mold to obtain a foamed product.

By this method, a foamed product having a large thickness, preferably 20 to 80 mm, a gel content of 70 to 99%, an apparent density of 0.2 to 0.02 g/cm$^3$, preferably 0.1 to 0.03 g/cm$^3$, 25% compression set at 40° C. of 0.1 to 20.0%, 25% compression hardness of 0.1 to 1.0 kgf/cm$^2$ and Asker C type surface hardness of 3 to 40 is obtained. The foamed product of the present invention has a tensile strength of at least about 12 kgf/cm$^2$ and up to about 50 kgf/cm$^2$.

If the gel content of the foamed product exceeds 99%, the extensibility of the polymer during the foaming step will be too inferior to obtain a satisfactory foam. Conversely, if the gel content of the foamed product is less than 70%, it will exhibit inferior compression set and will not be used for cushioning materials, padding materials for bedding or the like.

If the apparent density of the foam obtained exceeds 0.2 g/cm$^3$, it will be too hard to fit for such applications as cushioning materials, padding materials for bedding or the like. Conversely, if the apparent density is less than 0.02 g/cm$^3$, the foamed product is lacking in hardness. If the 25% compression set at 40° C. of the foamed product exceeds 20%, it will be unfit for use as padding materials for bedding or the like. Accordingly, the 25% compression set at 40° C. is desired to be in the range of 0.2 to 14.0%. If the 25% compression hardness is less than 0.1 kgf/cm$^3$, the impact resilience of the foamed product will be unduly low so that it will be unfit for use as sealing materials, cushioning materials, etc. Conversely, if the 25% compression hardness of the foamed product exceeds 1.0 kgf/cm$^2$, it will be too hard to be used for padding materials for bedding, cushioning materials, etc. If the Asker C type surface hardness of the foamed product exceeds 40, it will be too hard to be used for padding materials for bedding, cushioning materials, etc. If the Asker C type surface hardness of the foamed product is less than 3, it will be too soft to be used for sealing materials, padding materials for bedding or the like.

The term "gel content" used in this specification means the ratio (percentage) of the weight of the sample after extraction to that before extraction, wherein the extraction is carried out under reflux of xylene used as a solvent during 10 hours (extraction temperature: boiling point; 114° C., reflux rate: 12 minutes/cycle) by means of a soxhlet extractor using a metal gauze of 80 mesh.

In accordance with the present invention, a foamed product of a high expansion ratio, which could not be obtained by the conventional one step foaming method, can be produced by blending 100 parts by weight of resin with 6 to 10 parts by weight of an organic blowing agent because the crosslinking of the resin proceeds rapidly. In order to obtain a foam with an expansion ratio of not less than 15 times the original volume by the conventional one step foaming method under pressure, the resin to be used is desired to have the MFR of 0.3 to 30 g/10 minutes, and the gel content of the foam is preferably from 80 to 99%. If the MFR exceeds 30 g/10 minutes, a melt viscosity of a composition will be too low to cause expansion.

In the method of the present invention, an anti-oxidant may be incorporated into the composition to control the crosslinking reaction of the resin used, thereby widening the foaming conditions.

The crosslinking agents which are usable in the present invention means organic peroxides which decompose in a polyethylene-based resin at a temperature at least higher than the flow point of the polyethylene-based resin upon being heated to liberate free radicals capable of giving rise to intermolecular or intramolecular crosslinked bonds and, therefore, serve advantageously as radical generators. Examples of such organic peroxides include, but are not limited to: dicumyl peroxide, 1,1-ditertiary-butylperoxy-3, 3,5-trimethyl cyclohexane, 2,5-dimethyl-2,5-ditertiary-butyl peroxyhexane, 2,5-dimethyl-2,5-ditertiary-butyl peroxyhexine, α, α-ditertiary-butyl peroxydiisopropyl benzene, tertiary-butyl peroxy ketone, tertiary-buthyl peroxy benzoate, etc. The organic peroxide which best suits the particular type of the resin to be used should be selected.

The blowing agents which are usable in the present invention are chemical blowing agents having the decomposition temperature higher than the melting point of the polyethylene-based resin. Examples of such chemical blowing agents include, but are not limited to: azo type compounds such as azodicarbonamide and barium azodicarboxylate; nitroso type compounds such as dinitrosopentamethylene tetramine and trinitrosotrimethyl triamine; hydrazide type compounds such as p,p'-oxybis (benzene sulfonyl hydrazide); sulfonyl semicarbazide type compounds such as p,p'-oxybis(benzene sulfonyl semicarbazide) and toluenesulfonyl semicarbazide, etc.

A foaming aid may be added into the composition depending on the particular type of blowing agent to be used. Examples of such aids include, but are not limited to: compounds having ureas as a principal component; metal oxides such as zinc oxide and lead oxide; compounds having salicylic acid, stearic acid, etc. as a principal component, i.e. higher fatty acids, metal compounds of higher fatty acids, etc.

Besides, to effect the improvement of the properties of composition prepared and the reduction of cost, if desired, there may be added into the composition the compounding additives or fillers which do not exert very harmful influence on the crosslinkage of the resin used, for example, metal oxides such as carbon black, zinc oxide, titanium oxide, calcium oxide, magnesium oxide and silicon dioxide; carbonates such as magnesium carbonate and calcium carbonate; fibrous filler materials such as pulp; various dyes; pigments; fluorescent materials; and rubber compounding ingredients commonly used.

The resin composition to be used may further incorporate therein, within the range not impairing the object of the present invention, other thermoplastic resins such as high pressure low-density polyethylene, linear low-density polyethylene, medium-density polyethylene, high-density polyethylene, polypropylene, ethylene-propylene rubber, polyvinyl acetate, and polybutene in addition to the aforementioned polyethylene-based resin to manufacture a foam.

As mentioned above, in accordance with the method of the present invention, since a foam is produced by using as a starting material the aforementioned ethylene-olefin copolymer polymerized by using a metallocene catalyst and having specific properties, the expansion ratio up to 20 times the original volume or more can be accomplished by the one step foaming method under pressure with high productivity. The resultant foam has the same heat resistance as low-density polyethylene, the same extensibility as ethylene-vinyl acetate copolymer, and uniform properties.

Now, the present invention will be described more specifically below with reference to working examples.

EXAMPLE 1

A composition consisting of 100 parts by weight of a polyethylene-based resin polymerized with a metallocene catalyst (produced by Mitsubishi Chemical Co., Ltd. and marketed under trademark designation of "Kernel 55 FIK", density (D); 0.902 g/cm$^3$, MFR; 2.2 g/10 minutes, Tem; 112° C.), 6.0 parts by weight of azo-dicarbonamide, 2.0 parts by weight of zinc white, 0.5 part by weight of zinc stearate, and 0.8 part by weight of dicumyl peroxide was intimately kneaded in a mixing roll. The kneaded composition was charged into a mold (19 mm×155 mm×155 mm) and heated in the closed mold sealed under the pressure of 100 kgf/cm$^2$ at 155° C. for 35 minutes and the pressure was released to obtain a crosslinked polyethylene-based resin foam having uniform fine cells.

The resultant foam (46×370×370 mm) had an apparent density of 0.066 g/cm$^3$, a gel content of 90%, 25% compression hardness specified by JIS K 6767 of 0.57 kgf/cm$^2$, 25% compression set at 40° C. of 8.5%, Asker C type surface hardness of 30, elongation of 170%, and a thermal change in dimension of −1.3%. It has the same elongation as EVA and the same heat resistance as low-density polyethylene.

The thermal change in dimension was determined in accordance with the method described in JIS K 6767 by cutting a sample sheet from a foamed product, allowing the sample sheet to stand at rest for 22 hours in an air oven at 70° C. and then in a chamber at 23±5° C. for one hour, and measuring the change in thickness of the sample sheet.

EXAMPLE 2

A composition consisting of 100 parts by weight of the polyethylene-based resin polymerized with a metallocene catalyst (Kernel 55 FIK), 8.0 parts by weight of azodicarbonamide, 2.0 parts by weight of zinc white, 0.5 part by weight of zinc stearate, and 0.8 part by weight of dicumyl peroxide was intimately kneaded in a mixing roll. The kneaded composition was charged into a mold (19 mm×155 mm×155 mm) and heated in the closed mold sealed under the pressure of 100 kgf/cm$^2$ at 155° C. for 35 minutes and the pressure was released to obtain a crosslinked polyethylene-based resin foam having uniform fine cells.

The resultant foam (51×420×420 mm) had an apparent density of 0.046 g/cm$^3$, a gel content of 87%, 25% compression hardness specified by JIS K 6767 of 0.45 kgf/cm$^2$, 25% compression set at 40° C. of 8.4%, Asker C type surface hardness of 23, elongation of 180%, and a thermal change in dimension of −1.3%. It has the same elongation as EVA and the same heat resistance as low-density polyethylene.

COMPARATIVE EXAMPLE 1

The procedure of Example 2 was repeated using the same composition as in Example 2 except that the polyethylene-based resin was changed to low-density polyethylene (produced by Mitsubishi Chemical Co., Ltd. and marketed under trademark designation of "NOVATEC YF-30", density (D); 0.920 g/cm$^3$, MFR; 1.1 g/10 minutes, Tem; 108° C.) to obtain a foam. Since the polymer unduly extended upon releasing the pressure, cracks have occurred in a foam.

COMPARATIVE EXAMPLE 2

The procedure of Example 1 was repeated using the same composition as in Example 1 except that the polyethylene-based resin was changed to low-density polyethylene (NOVATEC YF-30) to obtain a foam. The resultant foam had an apparent density of 0.066 g/cm$^3$, elongation of 120%, and a thermal change in dimension of −1.3%. It was inferior in elongation to that obtained in Example 1.

COMPARATIVE EXAMPLE 3

The procedure of Example 1 was repeated using the same composition as in Example 1 except that the polyethylene-based resin was changed to ethylene-vinyl acetate copolymer (produced by Mitsubishi Chemical Co., Ltd. and marketed under trademark designation of "NOVATEC EVA LV440", vinyl acetate content; 15%, MFR; 2.0 g/10 minutes, density (D); 0.936 g/cm$^3$, Tem; 89° C.) to obtain a foam.

The obtained foam had an apparent density of 0.066 g/cm$^3$, elongation of 170%, and a thermal change in dimension of −3.3%. It was inferior in the thermal change in dimension to that obtained in Example 1.

EXAMPLE 3

The procedure of Example 1 was repeated using the same composition as in Example 1 except that the resin was changed to a polyethylene-based resin polymerized with a metallocene catalyst (produced by Mitsubishi Chemical Co., Ltd. and marketed under trademark designation of "Kernel 65 FIK", density; 0.907 g/cm$^3$, MFR; 2.2 g/10 minutes) to obtain a foam. The resultant foam (48×385×385 mm) had an apparent density of 0.061 g/cm$^3$, a gel content of 91%, 25% compression hardness specified by JIS K 6767 of 0.69 kg/cm$^2$, 25% compression set at 40° C. of 7.6%, Asker C type surface hardness of 32, elongation of 170%, and a thermal change in dimension of −1.2%. It had the same elongation as EVA and the same heat resistance as low-density polyethylene.

The formulations of the compositions used in Examples 1–3 and Comparative Examples 1–3 and the physical properties of the foamed products respectively produced are collectively shown in Table 1.

TABLE 1

| | Example No. | | | Comparative Example No. | | |
|---|---|---|---|---|---|---|
| | 1 | 2 | 3 | 1 | 2 | 3 |
| Formulation (in parts by weight) | | | | | | |
| 55FIK | 100 | 100 | | | | |
| 65FIK | | | 100 | | | |
| LDPE | | | | 100 | 100 | |
| EVA | | | | | | 100 |
| ADCA | 6.0 | 8.0 | 6.0 | 8.0 | 6.0 | 6.0 |
| ZnO | 2.0 | 2.0 | 2.0 | 2.0 | 2.0 | 2.0 |
| Zn-Stearate | 0.5 | 0.5 | 0.5 | 0.5 | 0.5 | 0.5 |
| DCP | 0.8 | 0.8 | 0.8 | 0.8 | 0.8 | 0.8 |
| Pressing conditions: | | | | | | |
| Size of mold | 19 t × 155 × 155 mm | | | | | |
| Heating temp. | 155° C. | | | | | |
| Heating time | 35 min. | | | | | |
| External pressure | 100 kg/cm$^2$ | | | | | |
| Appearance | Good | Good | Good | Presence of cracks | Good | Good |
| Apparent density | 0.066 | 0.046 | 0.061 | | 0.066 | 0.066 |
| Gel content | 90% | 87% | 91% | | | |
| Compression hardness | 0.57 | 0.45 | 0.69 | | | |
| Compression set | 8.5% | 8.4% | 7.6% | | | |
| Surface hardness | 30 | 23 | 32 | | | |
| Elongation | 170% | 180% | 170% | | 120% | 170% |
| Thermal change in size | −11.3% | −1.3% | −1.2% | | −1.3% | −3.3% |
| Raw material: | | | | | | |

TABLE 1-continued

| | Example No. | | | Comparative Example No. | | |
|---|---|---|---|---|---|---|
| | 1 | 2 | 3 | 1 | 2 | 3 |
| Density D | 0.902 | 0.902 | 0.907 | 0.920 | 0.920 | 0.936 |
| Tem | 112 | 112 | 113 | 108 | 108 | 89 |
| Q value | 2.8 | 2.8 | 2.8 | 5.1 | 5.1 | 4.0 |

EXAMPLE 4

A composition consisting of 100 parts by weight of a polyethylene-based resin polymerized with a metallocene catalyst (produced by Japan Polychem Corporation and marketed under trademark designation of "Kernel KF261", density (D); 0.898 g/cm³, MFR; 2.2 g/10 minutes, critical shear rate; 243.2 sec$^{-1}$), 5.0 parts by weight of azodicarbonamide, 2.0 parts by weight of zinc white, 0.5 part by weight of zinc stearate, and 0.6 part by weight of dicumyl peroxide was intimately kneaded in a mixing roll. The kneaded composition was charged into a mold (19 mm×155 mm×155 mm) and heated in the closed mold sealed under the pressure of 100 kgf/cm² at 155° C. for 35 minutes and the pressure was released to obtain a crosslinked polyethylene-based resin foam having uniform fine cells.

The resultant foam (46×370×370 mm) had an apparent density of 0.067 g/cm³, a tensile strength of 15.24 kgf/cm², and an elongation of 237%. The tensile strength and elongation were measured according to the method described in JIS K 6767.

EXAMPLE 5

The procedure of Example 4 was repeated using the same composition as in Example 4 except that the polyethylene-based resin "Kernel KF261" was changed to a polyethylene-based resin polymerized with a metallocene catalyst (produced by Japan Polychem Corporation and marketed under trademark designation of "Kernel KF370", density (D); 0.905 g/cm³, MFR; 3.4 g/10 minutes, critical shear rate; 364.8 sec$^{-1}$) to obtain a foam.

The resultant foam (46×370×370 mm) had an apparent density of 0.069 g/cm³, a tensile strength of 17.00 kgf/cm², and an elongation of 225%.

COMPARATIVE EXAMPLE 4

The procedure of Example 4 was repeated using the same composition as in Example 4 except that the polyethylene-based resin "Kernel KF261" was changed to a polyethylene-based resin polymerized with a metallocene catalyst (produced by Dow Chemical Company and marketed under trademark designation of "Affinity PF1140", density (D); 0.895 g/cm³, MFR; 1.7 g/10 minutes, critical shear rate; 608.0 sec$^{-1}$) to obtain a foam.

The resultant foam (46×370×370 mm) had an apparent density of 0.067 g/cm³, a tensile strength of 11.51 kgf/cm², and an elongation of 275%.

COMPARATIVE EXAMPLE 5

The procedure of Example 4 was repeated using the same composition as in Example 4 except that the polyethylene-based resin "Kernel KF261" was changed to a polyethylene-based resin polymerized with a metallocene catalyst (produced by Dow Chemical Company and marketed under trademark designation of "Affinity FW1650", density (D); 0.902 g/cm³, MFR; 3.4 g/10 minutes, critical shear rate; 608.0 sec$^{-1}$) to obtain a foam.

The resultant foam (46×370×370 mm) had an apparent density of 0.065 g/cm³, a tensile strength of 10.21 kgf/cm², and an elongation of 247%.

The physical properties of the polyethylene-based resins used in Examples 4 and 5 and Comparative Examples 4 and 5 are collectively shown in Table 2. The critical shear rates thereof are plotted in the diagram.

The critical shear rate (CSR) was determined by using a capillary rheometer (Capillograph IB, type PMD-C manufactured by Toyo Seiki K. K.) equipped with a flat type capillary (diameter: 1.0 mm, length: 10.0 mm) and extruding a given sample resin kept at 170° C. through the capillary at varying extrusion speeds, i.e. 0.5, 0.75, 1, 1.5, 2, 3, 5, 7.5, 10, 15, 20, 30, 50, 75, 100, 150, 200, 300, and 500 mm/min. The critical shear rate was defined by the extrusion speed just one step before the extrusion speed at which the resin caused whitening due to a melt fracture. The whitening was visually examined.

TABLE 2

| Copolymer | MFR (g/10 min.) | FR (MFR$_{10}$/MFR$_{2.16}$) | Density (g/cm³) | Critical shear rate (sec$^{-1}$) |
|---|---|---|---|---|
| Kernel KF261 | 2.2 | 5.7 | 0.898 | 243.2 |
| Kernel KF370 | 3.4 | 5.9 | 0.905 | 364.8 |
| Affinity PF1140 | 1.7 | 10.3 | 0.895 | 608.0 |
| Affinity FW1650 | 3.4 | 8.2 | 0.902 | 608.0 |

With respect to the flow ratio (FR) described in Table 2, the numeral attached to "MFR" means the load in kilogram used in the measurement. The MFR is equal to the MFR$_{2,16}$ (2.16 kg).

The physical properties of the foamed products obtained in Examples 4 and 5 and Comparative Examples 4 and 5 are collectively shown in Table 3.

TABLE 3

| No. | Apparent density (g/cm³) | Tensile strength (kgf/cm²) | Elongation (%) |
|---|---|---|---|
| Example 4 | 0.067 | 15.24 | 237 |
| Example 5 | 0.069 | 17.00 | 225 |
| Comparative Example 4 | 0.067 | 11.51 | 275 |
| Comparative Example 5 | 0.065 | 10.21 | 247 |

It will be clear from the results shown in Table 3 that the foams obtained in Examples 4 and 5 had the higher tensile strength than those obtained in Comparative Examples 4 and 5.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What we claim is:

1. A crosslinked ethylene-olefin copolymer foam which has a gel content of 70% to 99%, an apparent density of 0.2 to 0.02 g/cm$^3$, 25% compression set at 40° C. of 0.1 to 20.0%, 25% compression hardness of 0.1 to 1.0 kgf/cm$^2$ and Asker C type surface hardness of 3 to 40, wherein the foam is foamed from a copolmer of ethylene and α-olefin having 3 to 18 carbon atoms, the copolymer having a melt flow rate (MFR) of 0.1 to 100 g/10 minutes, a critical shear rate (CSR) satisfying the equation: $\log[CSR] \leq 2.48 + 0.500 \times \log[MFR]$, a density of 0.860 to 0.935 g/cm$^3$, a Q value determined by size exclusion chromatography (SEC) of 1.5 to 4, and an extrapolated end temperature of melting (Tem) of 65° to 130° C.

2. The crosslinked ethylene-olefin copolymer foam according to claim 1, wherein said copolymer of ethylene and α-olefin has the relation between the Tem and the density (D) represented by the formula: $833D-674 \leq Tem \leq 286D-137$.

3. The crosslinked ethylene-olefin copolymer foam according to claim 1, wherein said foam is foamed from a copolymer of ethylene and α-olefin selected from the group consisting of propylene, 1-butene, 1-pentene, 1-hexene, 4-methylpentene-1, and 1-octene, polymerized by using a metallocene catalyst.

4. A method for the production of a crosslinked ethylene-olefin copolymer foam, comprising the steps of:

kneading a copolymer of ethylene and α-olefin having 3 to 18 carbon atoms with a blowing agent and a crosslinking agent to obtain a crosslinkable and foamable composition, said copolymer having a melt flow rate (MFR) of 0.1 to 100 g/10 minutes, a critical shear rate (CSR) satisfying the equation: $\log[CSR] \leq 2.48 + 0.500 \times \log[MFR]$, a density of 0.860 to 0.935 g/cm$^3$, a Q value determined by size exclusion chromatography (SEC) of 1.5 to 4, and an extrapolated end temperature of melting (Tem) of 65° to 130° C., heating the resultant crosslinkable and foamable composition under pressure to decompose the crosslinking agent and the blowing agent, and releasing the pressure applied to the composition to obtain a crosslinked, foamed product which has an expansion ratio of 10 to 30 times the original volume of the composition.

5. The method according to claim 4, wherein said copolymer has the relation between the Tem and the density (D) represented by the formula: $833D-674 \leq Tem \leq 286D-137$.

6. The method according to claim 4, wherein said blowing agent is present in the crosslinkable and foamable composition in an amount of 6 to 10 parts by weight, based on 100 parts by weight of the copolymer.

7. The method according to claim 4, wherein said blowing agent is a chemical blowing agent selected from the group consisting of azo compounds, nitroso compounds, hydrazide compounds, sulfonyl semicarbazide compounds, and toluenesulfonyl semicarbazide.

8. The method according to claim 4, wherein said crosslinking agent is an organic peroxide having a decomposition temperature higher than a flow temperature of the ethylene-olefin copolymer.

* * * * *